United States Patent [19]

Tudor et al.

[11] 4,384,453
[45] May 24, 1983

[54] POD INSTALLATION FOR A GAS TURBINE ENGINE

[75] Inventors: Alan J. Tudor, Allestree; Harry Hurdis, Duffield, both of England

[73] Assignee: Rolls-Royce Limited, London, England

[21] Appl. No.: 190,258

[22] Filed: Sep. 24, 1980

[30] Foreign Application Priority Data

Oct. 23, 1979 [GB] United Kingdom ............. 7936690

[51] Int. Cl.³ ..................... B64D 27/00; F02C 7/20
[52] U.S. Cl. ............................... 60/39.31; 244/54; 248/554
[58] Field of Search ............ 60/39.31, 226 A, 226 R, 60/200 A, 200 R, 246, 230, 262, 244, 248; 244/53 B, 54; 248/554, 555, 556, 557

[56] References Cited

U.S. PATENT DOCUMENTS

| 2,693,674 | 11/1954 | Anxionnaz et al. | 60/262 |
| 3,385,064 | 5/1968 | Wilde et al. | 60/226 R |
| 3,496,725 | 2/1970 | Ferri et al. | 60/262 |
| 3,526,092 | 9/1970 | Steel | 60/39.31 |
| 3,533,237 | 10/1970 | Rabone et al. | 60/226 |
| 3,750,983 | 8/1973 | Morris | 244/54 |
| 3,978,256 | 8/1976 | James | 244/119 |
| 4,132,079 | 1/1979 | Adamson et al. | 60/226 R |
| 4,147,029 | 4/1979 | Sargisson | 60/262 |
| 4,227,370 | 10/1980 | Kirker | 60/262 |

FOREIGN PATENT DOCUMENTS

| 2140347 | 2/1972 | Fed. Rep. of Germany | 60/226 R |
| 2557266 | 7/1976 | Fed. Rep. of Germany | 244/54 |

Primary Examiner—William R. Cline
Assistant Examiner—John M. Kramer
Attorney, Agent, or Firm—Cushman, Darby & Cushman

[57] ABSTRACT

A gas turbine engine pod installation comprises a core engine with a stiff carcase from which the engine is supported from a pylon. The core engine drives a fan which operates within a fan casing extending to downstream of the core engine nozzle so that the core and fan flows are mixed to provide propulsive thrust when they exit from the fan duct nozzle. The fan casing is supported from the core engine carcase by forward and rearward supports so that these supports, the fan casing and the carcase form a stiff loop of structure which supports and stiffens the carcase.

6 Claims, 1 Drawing Figure

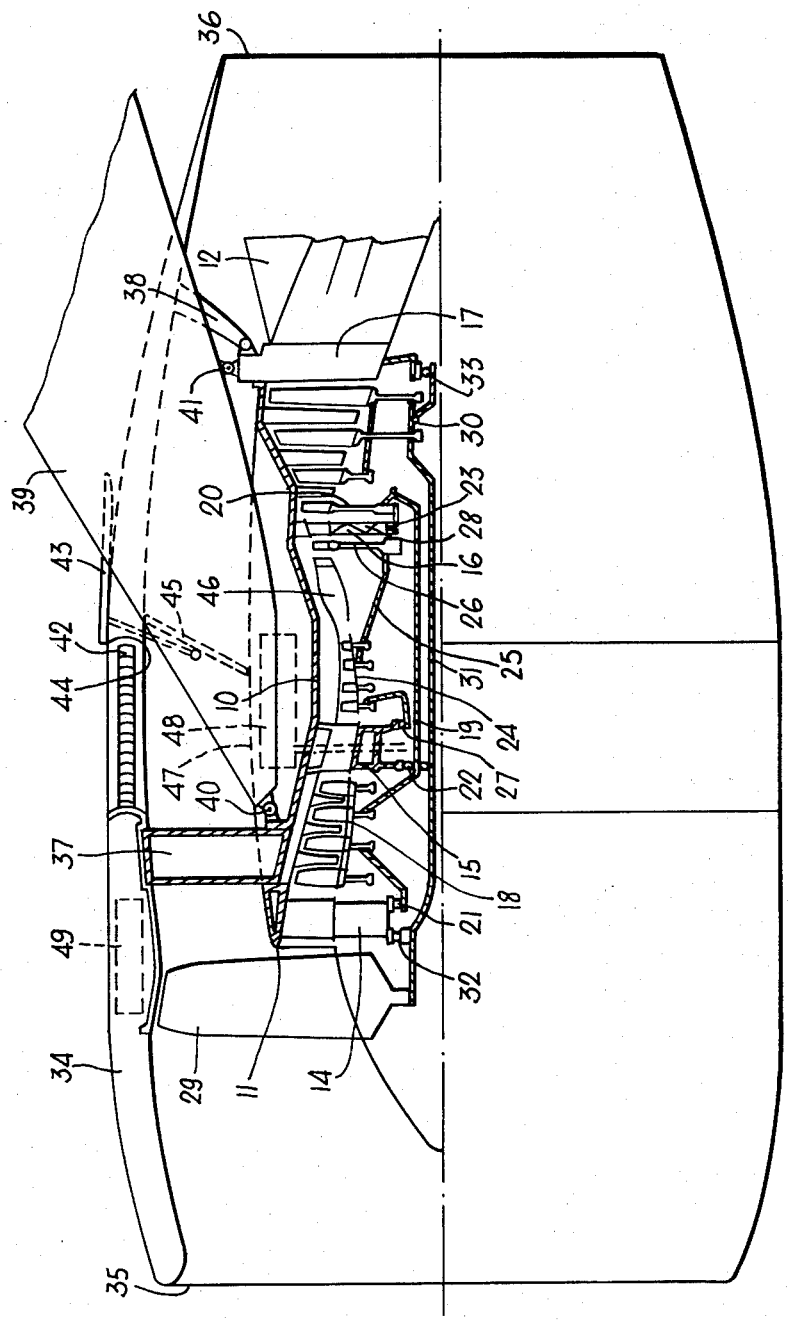

POD INSTALLATION FOR A GAS TURBINE ENGINE

This invention relates to a pod installation for a gas turbine engine.

The design of the pod structure in which a bare gas turbine engine is mounted can have a significant effect on the efficiency and life of the engine. Thus above and beyond the aerodynamic considerations, which are of course important, the pod structure needs to be light in weight and should if possible help to avoid distortions of the engine which cause engine clearances etc. to vary and deleteriously effect the performance of the engine itself.

We have invented a combination of structures for the pod installation of a gas turbine engine which can provide a reasonably light weight structure which has excellent stiffness and can give an outstanding degree of support to the engine itself.

According to the present invention a gas turbine engine pod installation comprises a core engine which has an intake and a nozzle, a fan driven from said core and operating within a fan duct defined by a fan casing and extending from a fan intake upstream of said core intake to a fan nozzle downstream of said core nozzle, the flows of fluid through said core engine and said fan being allowed to mix in the region between the core nozzle and the fan nozzle, mounting means on the carcase of said core engine adapted to carry the core engine from a pylon, and forward and rearward support means extending from said core engine to said fan casing adjacent to said core engine intake and nozzle respectively whereby said core engine casing, said support means and said fan casing between said forward and rearward support means comprises a stiff loop of structure which supports said engine carcase.

Preferably said fan casing is formed of a fibre reinforced composite material such as carbon fibre reinforced epoxy resin.

Said mounting means may be located adjacent to said support means, and may carry said core through bearing panels of the core engine.

A thrust reverser may be included in said fan casing between said forward and rearward support means.

The invention will now be particularly described with reference to the accompanying drawing, which is a half sectioned view of a gas turbine engine pod installation in accordance with the present invention.

In the drawing a core engine has a stiff carcase 10 which forms at its upstream end (to the left in the drawing) a core intake 11 and which carries at its downstream end a mixer nozzle 12 which is the core engine nozzle. The mixer nozzle 12 is of the interdigitating type such for instance as is described in the copending U.S. application Ser. No. 954,921, filed Oct. 24, 1978, by Timothy J. Kirker, and now U.S. Pat. No. 4,227,370, issued Oct. 14, 1980, the same being commonly assigned to Rolls-Royce Limited, London, England.

From the carcase 10 are carried internally bearing panels 14, 15, 16 and 17. The first three of these bearing panels in turn carry intermediate pressure and high pressure rotating assemblies; thus the intermediate pressure compressor 18, the shaft 19 and intermediate pressure turbine 20 are carried by bearings 21, 22 and 23 from the panels 14, 15 and 16 respectively. Similarly the high pressure compressor 24, shaft 25 and high pressure turbine 26 are carried by bearings 27, 28 from the panels 15 and 16 respectively.

The core engine operates to drive a fan 29 by the usual expedient of a low pressure turbine 30 driving a low pressure fan shaft 31 which in turn drives the fan 29. Once again these rotating components are carried through the panels back to the carcase 10. In this particular case the bearing 32 carries the shaft 31 from the panel 14 while the bearing 33 supports the rotating assembly via the panel 17.

The fan 29 operates on the air passing through a fan duct defined inside a fan casing 34. It will be seen that the intake 35 of the fan casing is upstream of the fan 29 and the core engine intake 11 and that the casing forms a final nozzle 36 which is downstream of the mixer nozzle 12. In order to support the casing 34 forward and rearward support means are provided taking the form of a forward set of guide vanes 37 which extend between the core engine carcase and the fan casing adjacent to the intake 11 and a rearward set of links 38 which extend between the core engine carcase 10 and the fan casing 34 adjacent to the mixer nozzle 12. The casing 34 is generally made of fibre reinforced composite material; in the present case filament wound carbon fibres in an epoxy resin matrix are used.

In order to mount the complete pod assembly of core engine and fan casing from the structure of the aircraft which it is intended to propel a pylon 39 is provided which extends from the aircraft structure and through the casing 34 to adjacent the core engine carcase 10. Mounting links are provided at 40 and 41 by which the core engine carcase 10 is attached to the pylon 39. It will be noted that the mountings 40 and 41 are very close to the supports 37 and 38 respectively.

An additional feature shown in the drawings comprises a fan flow thrust reverser. This is not illustrated in detail since it is of conventional form. However, it will be seen that it includes a cascade of vanes 42 and a sliding intermediate member 43 which operates through links 44 on blocker doors 45. When forward thrust is used the intermediate piece 43 is in the position shown in the lower half of the drawing but when reverse thrust is required it is translated rearwards to the position shown in the upper half of the drawing.

Aerodynamically operation of the core engine and fan is conventional. Thus ambient air is taken through the intake 35 to the fan 29 where its pressure is increased. Part of the air then flows through the fan duct in between the core engine and the fan casing to reach the mixer nozzle 12. The remaining air enters the core engine through the intake 11 where it is compressed in two stages by the intermediate pressure and high pressure compressors 18 and 24 and has fuel added to it and is burnt in the combustion chamber 46. The products of combustion expanding through the turbines 26, 20 and 30 drive the high pressure and intermediate pressure compressors and the fan respectively. Residual exhaust gases from the turbine 30 flow through the mixer 12 where they mix with the fan flow and the combined efflux then passes through the final nozzle 36. As is well known in the art the performance of the core engine is strongly affected by the clearances between various of the rotating blades of the engine and the associated static structure. It is therefore very important that any distortions of the engine and relative movements between rotating and static portions are avoided. In the embodiment described not only is the carcase 10 a stiff member in its own right but together with the vanes 37 links 38 and casing 34 it forms part of a stiff loop which is basically a very stiff structure. Therefore the engine carcase is well supported and since this carcase carries the various rotating parts through the bearing panels it is possible to maintain good concentricity of all the parts and thus to keep clearances as small as possible. It will also be seen that in this design the external aerodynamic casing 47 of the core engine encloses between itself and the carcase 10 a considerable annular space within which engine accessories may be mounted as shown in broken lines at 48 and the drive shafts necessary may conveniently pass through the bearing panel 15. As an alternative it will be possible to mount these accessories round the fan casing at 49. Permutations of these locations are possible, thus the aircraft accessories could be mounted at 49 or both sets of accessories could be located at either location.

It will be noted that because the thrust reverser forms part of the stiffness loop which is an important feature of the invention, it is necessary that the reverser should be able to transmit loads across itself. It is also desirable to make the thrust reverser in such a way that it can be completely opened up to allow access to the core engine. Thus opening cowls may be provided or the reverser and its associated fan duct may be split into two circumferential proportions which may be hinged open. It should also be noted that the absence of mounting structure immediately downstream of the vane 37 permits the reverser to be mounted well upstream and thus helps to reduce overhang of the pod installation beyond the front of the wing of the aircraft with which it is associated.

It should be appreciated that various modifications of the embodiment shown could be made. Thus in particular the aerodynamic details of the fan and core could be changed so that a single core could for instance be used and similarly a multi-stage fan could be operated.

We claim:
1. A gas turbine engine pod installation comprising:
a supporting pylon; and
an engine pod comprising:
a core engine having a carcase, an intake, and an exhaust nozzle;
a fan driven from said core engine;
a stiff light weight fan casing for said fan, said fan casing being made from a fiber reinforced composite material and defining a fan duct having a fan intake upstream of said core engine intake and a fan nozzle downstream of said core engine exhaust nozzle;
mixer means on said core engine exhaust nozzle for causing flows of fluid through said core engine and through said fan duct to mix downstream of said core engine exhaust nozzle;
mounting means on said core engine carcase for carrying said core engine from said pylon;
and forward and rearward load-bearing support means extending from the carcase of said core engine to said fan casing adjacent to said core engine intake and exhaust nozzle respectively, said forward support means includes vanes extending across said fan duct and said rearward support means includes links extending across said fan duct, said links being positioned upstream of said mixer means, said core engine carcase together with said forward and rearward load-bearing support means and said fan casing between said forward and rearward load-bearing support means forming a stiff loop of structure which supports and stiffens said core engine carcase and permits the engine pod to be installed and removed as a unit from said pylon.

2. A gas turbine engine pod installation as claimed in claim 1 and in which said fibre reinforced composite material comprises filament wound carbon fibre in an epoxy resin matrix.

3. A gas turbine engine as claimed in claim 1 and in which said mounting means includes a forward and rearward mounting member located adjacent to said forward and rearward support means respectively.

4. A gas turbine engine pod installation as claimed in claim 1 and in which said core engine has rotors carried by bearings from bearing panels through which the core engine is supported by said mounting means.

5. A gas turbine engine pod installation as claimed in claim 1 and in which a thrust reverser is located in said fan casing between said forward and rearward support means.

6. A gas turbine engine pod installation as claimed in claim 1 and comprising engine accessories for the core engine which are mounted on said carcase.

* * * * *